(12) United States Patent
Mitten et al.

(10) Patent No.: US 6,445,935 B1
(45) Date of Patent: Sep. 3, 2002

(54) ELECTRONIC DEVICES INCLUDING INDICATOR CONTROL CIRCUITS AND RELATED METHODS OF CONTROLLING INDICATORS

(75) Inventors: John W. Mitten, Cary; Earl R. Wingrove, Durham, both of NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/166,461

(22) Filed: Oct. 5, 1998

(51) Int. Cl.$^7$ .............................. H04B 1/38; H04B 1/00; H04J 7/00
(52) U.S. Cl. ....................... 455/567; 455/550; 455/575; 370/211; 375/238
(58) Field of Search ................................ 455/38.3, 574, 455/566, 567, 55, 573; 370/311, 212; 375/238

(56) References Cited

U.S. PATENT DOCUMENTS

| | | | | |
|---|---|---|---|---|
| 5,408,698 A | * | 4/1995 | Serizawa et al. | 455/245.1 |
| 5,414,862 A | * | 5/1995 | Suzuki et al. | 395/750 |
| 5,638,054 A | * | 6/1997 | Davis et al. | 340/825.44 |
| 5,933,453 A | * | 8/1999 | Lewison | 375/238 |
| 5,995,820 A | * | 11/1999 | Young et al. | 455/574 |
| 6,094,587 A | * | 7/2000 | Armanto et al. | 455/567 |
| 6,181,237 B1 | * | 1/2001 | Gehlot | 340/407.1 |
| 6,188,916 B1 | * | 2/2001 | Noda et al. | 455/567 |

* cited by examiner

Primary Examiner—Nay Maung
Assistant Examiner—Temica M. Davis
(74) Attorney, Agent, or Firm—Myers Bigel Sibley & Sajovec (57) ABSTRACT

An electronic device includes an indicator that generates an indication of an event responsive to an indicator control signal from an indicator control circuit coupled between a processor and the indicator. The processor generates an indicator off-time value and an indicator on-time value when an indication is desired, and the indicator control circuit receives the indicator off-time value and the indictor on-time value from the processor. More particularly, the indicator control circuit includes an off-time register, an on-time register, and an indicator control circuit. The off-time register stores the off-time value generated by the processor, and the on-time register stores the on-time value generated by the processor. The indicator control signal generator alternatingly enables the indicator control signal for a period of time determined by the on-time value stored in the on-time register and disables the indicator control signal for a period of time determined by the off-time value stored in the off-time register. The electronic device can also include an indicator pulse-duty register and a pulse width modulation circuit. The indicator pulse-duty register can be coupled to the processor and store an indicator pulse-duty generated by the processor. The pulse width modulation circuit can be coupled to the indicator pulse-duty register wherein the pulse width modulation circuit modulates a pulse width of the enabled indicator control signal in response to the indicator pulse-duty stored in the indicator pulse-duty register.

38 Claims, 3 Drawing Sheets

ELECTRONIC DEVICES INCLUDING INDICATOR CONTROL CIRCUITS AND RELATED METHODS OF CONTROLLING INDICATORS

FIELD OF THE INVENTION

The present invention relates to indicators for electronic devices and more particularly to control circuits for indicators.

BACKGROUND OF THE INVENTION

Many electronic devices such as radiotelephones and pagers include indicators to alert a user that something has happened or that some action is required. For example, an audible ringer can be used to indicate that a telephone call is being received or that a page has been received. Alternately, a vibrator can be used to provide silent indication.

Known controllers for devices including these indicators, however, may be software intensive. In particular, software operations may be needed to turn the indicator on, and to turn the indicator off. This may be particularly burdensome if the indicator is turned on and off repeatedly for a single indication. This is common, for example, with radiotelephone ringers that are repeatedly turned on and off until either the user answers the call or the calling party hangs up. In such a situation, individual software processing operations may be needed to turn the ringer on and off for each individual ring and to time the intervals that the ringer is turned on and off.

These software processing operations used to control the ringer may reduce time available for other processing operations thereby reducing the performance and/or increasing the complexity of the software as well as the processor running the software. Accordingly, there continues to exist a need in the art for improved circuits and methods to control indicators for electronic devices.

SUMMARY OF THE INVENTION

It is therefore an object of the present invention to provide improved circuits for controlling electronic indicators and related methods.

This and other objects are provided according to the present invention by storing an off-time value in an off-time register, and storing an on-time value in an on-time register. An indicator control signal is alternatingly enabled for a period of time determined by the on-time value stored in the on-time register and disabled for a period of time determined by the off-time value stored in the off-time register. Accordingly, a processor can load the on- and off-time values in the respective registers and then proceed with other operations so that processor overhead is reduced.

In particular, an electronic device can include an indicator that generates an indication of an event responsive to an indicator control signal, and a processor that generates an indicator off-time value and an indicator on-time value when an indication is desired. The electronic device can also include an indicator control circuit coupled between the processor and the indicator wherein the indicator control circuit receives the indicator off-time value and the indicator on-time value from the processor. More particularly, this indicator control circuit includes on- and off-time registers and an indicator control signal generator. The off-time register stores the off-time value generated by the processor, and the on-time register stores the on-time generated by the processor. The indicator control signal generator alternatingly enables the indicator control signal for a period of time determined by the on-time value stored in the on-time register and disables the indicator control signal for a period of time determined by the off-time value stored in the off-time register. Control of the indicator is thus handled by the indicator control circuit thereby reducing processor operations.

In addition, the indicator control signal can be disabled when the on-time value stored in the on-time register is zero. Accordingly, the indicator control circuit does not perform operations regardless of the off-time value stored in the off-time register. Moreover, the indicator can be turned off by storing an on-time value of zero in the on-time register.

More particularly, the indicator control signal generator can include a timer, a multiplexer, a comparator, and a latching circuit. The timer generates an incrementing elapsed time, and the multiplexer selects one of the on-time value from the on-time register and the off-time value from the off-time register. The comparator compares the incrementing elapsed time with the selected one of the on-time value and the off-time value and the comparator generates a signal when the elapsed time reaches the selected one of the on-time and the off-time values. The latching circuit switches a state of the indicator control signal and resets the timer responsive to the signal that the elapsed time has reached the selected one of the on-time and the off-time values, and the multiplexer selects the other of the on-time value and the off-time value responsive to the signal. Accordingly, the indicator control circuit can be implemented with hardware elements not requiring processor input other than the loading of the register values.

Furthermore, the timer can include a counter coupled to a clock, and the clock can be disabled when either the on-time value stored in the on-time register is zero, or the off-time value stored in the off-time register is zero. When the on-time value is zero, the indicator is turned off so that there is no need to operate the counter. When the off-time value is zero (and the on-time value is non-zero) the indicator is turned on continuously so that there is no need to count the on- and off-time values. In either case, battery drain and/or power consumption can be reduced by disabling the clock when it is not needed.

The processor can also generate an indicator pulse-duty value wherein the indicator control circuit receives this indicator pulse-duty value, and the indicator control circuit can include an indicator pulse-duty register and a pulse width modulation circuit. The indicator pulse-duty register stores the indicator pulse-duty value generated by the processor, and the pulse width modulation circuit modulates a pulse width of the enabled indicator control signal in response to the indicator pulse-duty value stored in the indicator pulse-duty register. The intensity of the enabled indicator control signal can thus be varied responsive to the indicator pulse-duty value thereby varying the intensity of the indication. The modulation circuit can thus be used to reduce or increase power consumed by the indicator thereby reducing or increasing battery drain according to battery charge and/or output desired. For example, the brightness, volume, or intensity of the indication can be controlled as a function of output desired and/or battery charge.

More particularly, the pulse width modulation circuit can include a timer and a comparator. The timer generates an incrementing elapsed time up to a predetermined value and then starts over, the comparator compares the elapsed time and the indicator pulse-duty value, and the pulse width modulation circuit modulates the pulse width of the enabled indicator control signal responsive to the comparison. In addition, the timer can include a counter coupled to a clock, and the clock can be disabled when the indicator control signal is disabled thereby reducing power consumption and/or battery drain when the clock is not needed.

In addition, the electronic device can include a transceiver coupled to the processor wherein the transceiver transmits and receives radio communications under control of the processor, and the indicator can be a buzzer, a ringer, a light, a vibrator, or an annunciator.

The devices and methods of the present invention can thus be used to control an indicator with reduced interaction from a device processor. In particular, the processor need only load registers with values defining the operating parameters for the indicator, and the indicator control circuit of the present invention generates the actual control signals for the indicator. In particular, on-time and off-time values can be stored in respective registers. Processor overhead can thus be reduced.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
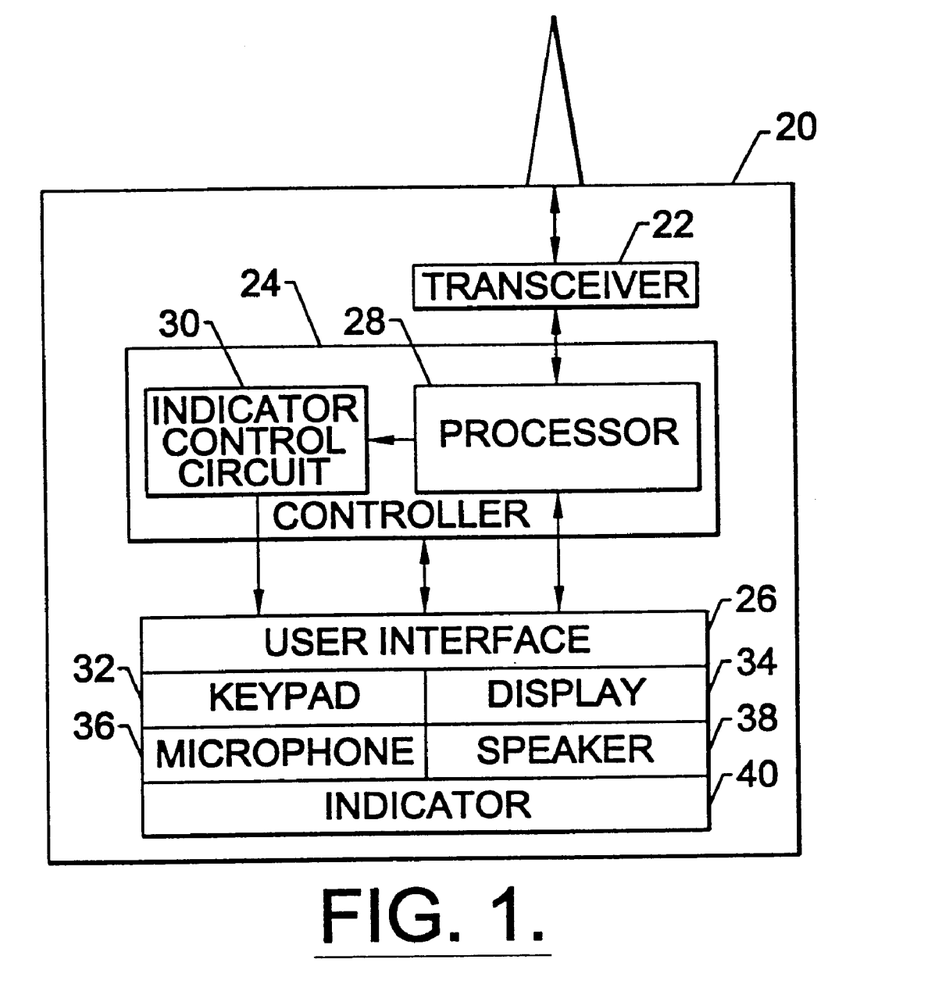
FIG. 1 is a block diagram of a radiotelephone including an indicator control circuit according to the present invention.

A block diagram of a radiotelephone including an indicator control circuit according to the present invention is illustrated in FIG. 1. As shown, the radiotelephone 20 includes a transceiver 22, controller 24, and a user interface 26. More particularly, the controller 24 includes a processor 28 and an indicator control circuit 30; and the user interface 26 includes a keypad 32, a display 34, a microphone 36, a speaker 38, and an indicator 40.

Accordingly, the radiotelephone 20 can be used to transmit and receive radiotelephone communications using the transceiver 22 under the control of the processor 28 as will be understood by those having skill in the art. More particularly, a user's speech can be received by the microphone 36 of the user interface 26 and transmitted to a radiotelephone communications system using the transceiver 22 under the control of the processor 28. In the other direction, speech from a distant party can be received by the transceiver 22 under the control of the processor 28 and reproduced by the speaker 38 of the user interface 26. The processor 28 can accept user input from the keypad 32 of the user interface 26, and information can be provided to the user through the display 34 of the user interface responsive to the controller 24.

According to the present invention, the indicator 40 of the user interface 26 operates under the control of the indicator control circuit 30 of the controller 24 thereby reducing the overhead within the processor 28 that may otherwise be needed to support the operation of the indicator 40. In particular, the indicator 40 is used to provide an indication of some event such as an incoming call, an incoming page, etc., and the indicator can be a buzzer, a ringer, a light such as a light emitting diode, a vibrator, an annunciator, or other indicator known to those having skill in the art. Furthermore, an audible indicator can be implemented, at least in part, using the speaker 38, or a visible indicator can be implemented, at least in part, using the display 34.

As an example, the indicator 40 can be a ringer used to indicate that there is an incoming call. In response to an incoming call, the indicator can be alternatingly turned on and off for one second intervals until either the radiotelephone 20 user answers the call, or the calling party hangs up. By controlling the indicator 40 using the indicator control circuit 30 of the present invention, the software overhead and/or complexity of the processor 28 can be reduced. In particular, the processor 28 need only provide on-time and off-time values to the indicator control circuit 30 in response to an incoming call. The actual activation and deactivation of the indicator 40 can be controlled by the indicator control circuit 30. In other words, the processor 28 is not required to perform any step at the beginning and end of each individual ring. The indicator control circuit 30 of the present invention can also provide pulse width modulation responsive to a pulse-duty value provided by the processor 28.

Figure 2:
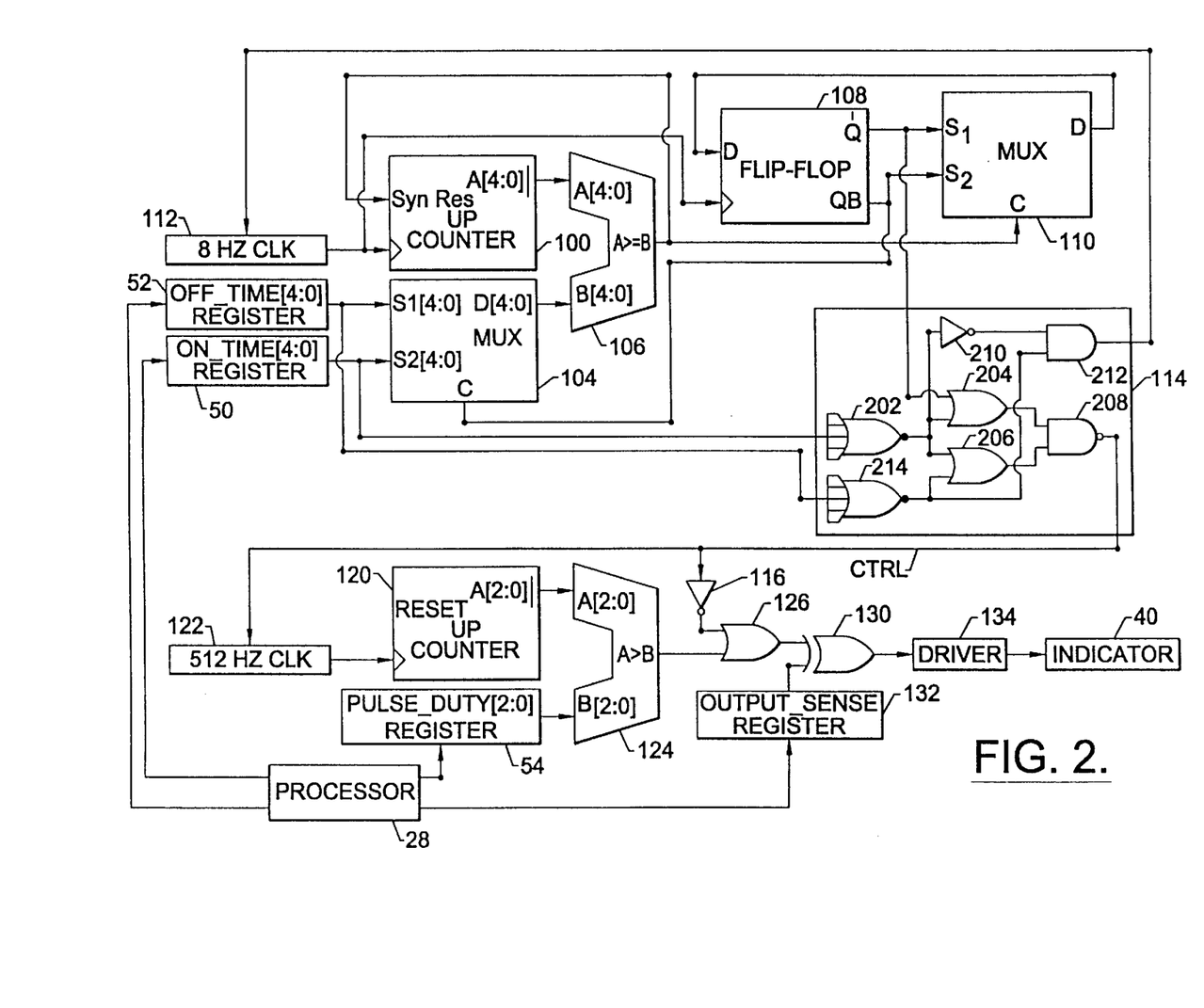
FIG. 2 is a schematic diagram of the indicator control circuit of FIG. 1.

A schematic diagram of an indicator control circuit according to the present invention is provided in FIG. 2. As shown, the on-time value is saved in the on-time register 50, the off-time value is saved in the off-time register 52, and the pulse-duty value is saved in the pulse-duty register 54, and these stored values are used to generate the indicator control signal provided to the indicator 40. Accordingly, the processor 40 need only provide the on-time, off-time, and pulse-duty values to the respective registers in the indicator control circuit 30, to initiate or change operation of the indicator. The indicator control circuit will then proceed to operate the indicator according to the stored values until new values are stored. For example, an on-time value of zero can be stored in the on-time register 50 to terminate operations of the indicator 40.

The indicator control circuit 30 also includes up-counter 100, multiplexer 104, comparator 106, flip-flop 108, multiplexer 110, clock 112, and logic circuit 114, which together enable and disable an indicator control signal on control line Ctrl used to control the indicator 40. The indicator control signal on the control line Ctrl can be inverted using inverter 116. Moreover, the intensity of an enabled indicator control signal can be varied using pulse width modulation techniques implemented responsive to a pulse-duty value stored in the pulse-duty register 54 using up-counter 120, clock 122, comparator 124, and OR gate 126. In addition, the exclusive OR (XOR) gate 130 and the single bit value stored in the output sense register 132 can be used to control the output state, and the driver 134 can be used to provide sufficient current to drive the indicator 40.

As shown, the logic circuit 114 generates the indicator control signal on the control line Ctrl responsive to the on-time and off-time values and responsive to the Q-output of flip-flop 108. In particular, if all bits of the on-time value stored in the on-time register 50 are zero, NOR gate 202 will generate a "one" output, OR gate 204 will generate a "one" output, OR gate 206 will generate a "one" output, and NAND gate 208 will generate a "zero" output on the control line Ctrl (a disabled indicator control signal). In addition, inverter 210 will generate a "zero" output, and AND gate 212 will generate a "zero" output thereby disabling the clock 112. Accordingly, a zero on-time value will result in a disabled input control signal, and by disabling the clock 112, power consumption and/or battery drain can be reduced during periods when the indicator is not activated. The clock 112 will also be disabled when all bits of the off-time value stored in the off-time register are "zero". In this situation, the OR gate 214 will generate a "zero" output, and the AND gate 212 will generate a "zero" output thereby disabling the clock 112.

When the on-time and off-time values are both non-zero, the NOR gate 202 will generate a "zero" output, and the OR gate 214 will generate a "one" output. The OR gate 206 will thus generate a "one" output, and the output of the OR gate 204 will be dependent on the Q-output of the flip-flop 108. The output of the NAND gate 208 in turn will thus also be dependent on the Q-output of the flip-flop 108. Accordingly, when the Q-output is "one" with non-zero on-time and off-time values, the NAND gate 208 will generate a "zero" output (a disabled indicator control signal). When the Q-output is non-zero on-time and off-time values, the NAND gate 208 will generate a "one" output (an enabled indicator control signal).

With non-zero on-time and off-time values, the Q-output of the flip-flop 108 will alternate between "one" and "zero" so that the indicator control signal is alternatingly enabled and disabled for periods of time determined by the on-time and off-time values. For example, the flip-flop 108 can be designed so that the Q-output generates a "zero" output when initially powered on. This initial value will be maintained until the D-input is changed responsive to the multiplexer 110 and the comparator 106. If the initial value of the Q-output of flip-flop 108 is "zero", the initial value of the QB-output (the inverse of the Q-output) will be "one".

As shown in FIG. 2, the QB-output of flip-flop 108 is provided to the S$_2$-input of multiplexer 110 and to the C-input of multiplexer 104. Accordingly, the QB-output of flip-flop 108 controls the selection by multiplexer 104 of either the off-time value stored in off-time register 52 or the on-time value stored in on-time register 50. In particular, a QB-output of "one" can result in the selection of the on-time value, a QB-output of "zero" can result in the selection of the off-time value, and the selected value is provided to the B-input of the comparator 106. If the QB-output of flip-flop 108 is initially set to "one", the multiplexer can select the on-time value stored in the on-time register 52 and provide this value to the B-input of the comparator 106.

The up-counter 100 generates an incrementing elapsed time responsive to the clock 112, and this incrementing elapsed time is provided to the A-input of the comparator 106. In the example of FIG. 2, the incrementing elapsed time increases until the incrementing elapsed time reaches the on-time value at which point the output of the comparator 106 goes from "zero" to "one". In the context of this disclosure, the term reaches can mean that the incrementing elapsed time is equal to or exceeds the B-input of the comparator 106 when an up-counter is used. In addition, incrementing elapsed time is defined to include either an increasing or decreasing incrementing elapsed time so that either an up-counter or a down-counter can be used. In the context of a down-counter, reaches can mean that the incrementing elapsed time is equal to or less than the B-input of the comparator 106.

When the incrementing elapsed time generated by the up-counter reaches the on-time value, the comparator output transitions from "zero" to "one" for one clock cycle. This "one" output is applied to the reset input for the up-counter 108 so that the incrementing elapsed time is reset to zero. Once the incrementing elapsed time is reset to zero, the output of the comparator 106 will return to "zero" so that the comparator 106 output is only "one" for a single clock cycle. This "one" output from the comparator 106 is also applied to the C-input of multiplexer 110 for one clock cycle. Accordingly, the multiplexer 110 selects the QB-output from the flip-flop 108 for one clock cycle, and the QB-output value is fed back by multiplexer 110 to the D-input of the flip-flop 108 thereby switching the Q-output to "one" and switching the QB-output to "zero". When the comparator 106 output returns to "zero", the multiplexer 110 reselects the Q-output of the flip-flop 108 so that the Q-output is latched to "one" and the QB-output is latched to "zero". With the QB-output of flip-flop 108 latched to "zero" the multiplexer 104 selects the off-time stored in the off-time register 52.

With the off-time value selected by the multiplexer 104 and applied to the B-input of the comparator 106, the incrementing elapsed time is compared to the off-time value. When the incrementing elapsed time generated by the up-counter 100 reaches the off-time value, the comparator 106 output goes from "zero" to "one" for one clock cycle resetting the up-counter 100 and reversing the flip-flop 108 outputs so that the Q-output is "zero" and the QB-output is "one". The on-time value stored in the on-time register is thus reselected by the multiplexer 104 and applied to the B-input of the comparator 106, and the cycle is repeated.

Accordingly, when the on-time and off-time values are both non-zero, the output of NAND gate 208 (on control line Ctrl) switches back and forth between "one" (enabled indicator control signal) for a period of time determined by the on-time value stored in the on-time register 50 and "zero" (disabled indicator control signal) for a period of time determined by the off-time value stored in the off-time register 52. This operation continues until new values are stored in the on-time and/or off-time registers. For example, zero can be stored in the on-time register 50 so that the output of NAND gate 208 generates a "zero" on the control line Ctrl (disabled indicator control signal). As discussed above, when the on-time value is zero, the clock 112 is disabled to save power.

When the on-time value is non-zero but the off-time value is zero, the NAND gate 208 output is "one" and does not switch. Accordingly, the indicator control signal is continuously enabled until either a non-zero value is stored in the off-time register 52, or zero is stored in the on-time register 50. In addition, the clock 112 is disabled when the off-time value is zero to reduce power consumption.

In a particular example of the indicator control circuit of FIG. 2, the clock 112 can be an 8 Hz clock, the on-time and off-time registers 50 and 52 can be five bit registers, and the up-counter 100 can be a five bit counter. Accordingly, the on-time and the off-time can be varied over a range of 0.125 seconds to 3.875 seconds in 0.125 second intervals. These intervals and ranges can be adapted to different applications by changing the frequency of the clock 112 and by changing the sizes of the registers 50 and 52 and the counter 100.

The indicator control signal generated on the control line Ctrl can be used to drive the indicator through inverter 116, driver 134, and/or other circuitry used to provide desired signal levels. As will be understood, the driver 134 can be defined as a portion of the indicator control circuit 30, as a portion of the user interface 26, or as a portion of indicator 40. In addition, the enabled indicator control signal can be pulse width modulated using the clock 122, the up-counter 120, the pulse-duty register 54, the comparator 124, and the OR gate 126.

In particular, the up-counter 120 generates an incrementing elapsed time in response to the clock 122. The up-counter counts from an initial value up to a predetermined number and starts over at the initial value, and the comparator 124 compares the incrementing elapsed time generated by up-counter 120 with the pulse-duty value stored in the pulse-duty register 54. In this example, the comparator 124 output generates a "zero" as long as the incrementing elapsed time is less than or equal to the pulse-duty value, and the comparator 124 generates a "one" when the incrementing elapsed time is greater than the pulse-duty value. The comparator 124 output is combined with the inverted indicator control signal using the OR gate 126. In summary, an enabled indicator control signal will generate a "zero" at the output of the inverter 116 so that an active low pulse width modulated wave form is generated responsive to the comparator 124 output. A disabled indicator control signal will generate a "one" at the output of the inverter 116 so that the indicator is disabled.

An enabled indicator control signal with a "one" on the control line Ctrl thus results in a "zero" out of inverter 116 that is combined with the output of the comparator 124. Moreover the output of the comparator 124 switches between "one" and "zero" at a frequency determined by the counter 120 and the clock 122, and the proportion of a cycle at "zero" is directly proportional to the magnitude of the pulse-duty value. At one extreme where the pulse duty value is one, the comparator 124 output will have a 12.5% duty cycle so that the indicator duty cycle is effectively 12.5%. At the other extreme where the pulse duty value is equal to the highest value (in this case zero signifying eight) of the incrementing elapsed time, the comparator 124 output will always be "zero" so that the indicator duty cycle is effectively 100%. When the pulse-duty value is equal to one half of the highest value of the incrementing elapsed time, the comparator 124 output will be "zero" for half of each cycle and "one" for half of each cycle so that the indicator duty cycle is effectively 50%.

In a particular example of the indicator control circuit of FIG. 2, the clock 122 can be a 512 Hz clock, the pulse-duty register 54 can be a three bit register, and the up-counter 120 can be a 3-stage binary up-counter. This structure provides an active low 64 Hz pulse width modulated waveform. Accordingly, the intensity of the output drive can be controlled in a range from 100% (maximum intensity) down to 12.5% (minimum intensity) in steps of 12.5%. These intervals and ranges can be adapted to different applications by changing the frequency of the clock 122 and by changing the sizes of the register 54 and the size of the counter 120. In addition, to controlling the intensity of the indicator, the pulse-duty control can be used to reduce battery drain and/or power consumption by reducing the average current drawn by the indicator.

Moreover, when the indicator is a light emitting diode (LED), a 64 Hz modulation is sufficient to make flicker imperceptible. Other indicator devices, such as vibrators, may have sufficiently slow responses that they act as low pass filters to integrate the pulses. In addition, incrementing elapsed time is defined to include an increasing or decreasing incrementing elapsed time so that either an up-counter or a down-counter can be used.

The exclusive OR (XOR) gate 130 can be used to provide output sense control responsive to a single bit output-sense value stored in the output-sense register 132. In other words, the XOR gate 130 can be used to convert the active low signal from the OR gate 126 to an active high signal. The driver 134 can be used to convert the logic signals generated by XOR gate 130 to drive signals with adequate current to drive the indicator.

In addition, the indicator control signal on control line Ctrl can be provided to the clock 122 so that the clock 112 is disabled when the indicator control signal is disabled ("zero" on the control line Ctrl). By disabling the clock 122 when the indicator is disabled, power consumption and battery drain can be reduced.

Figure 3:
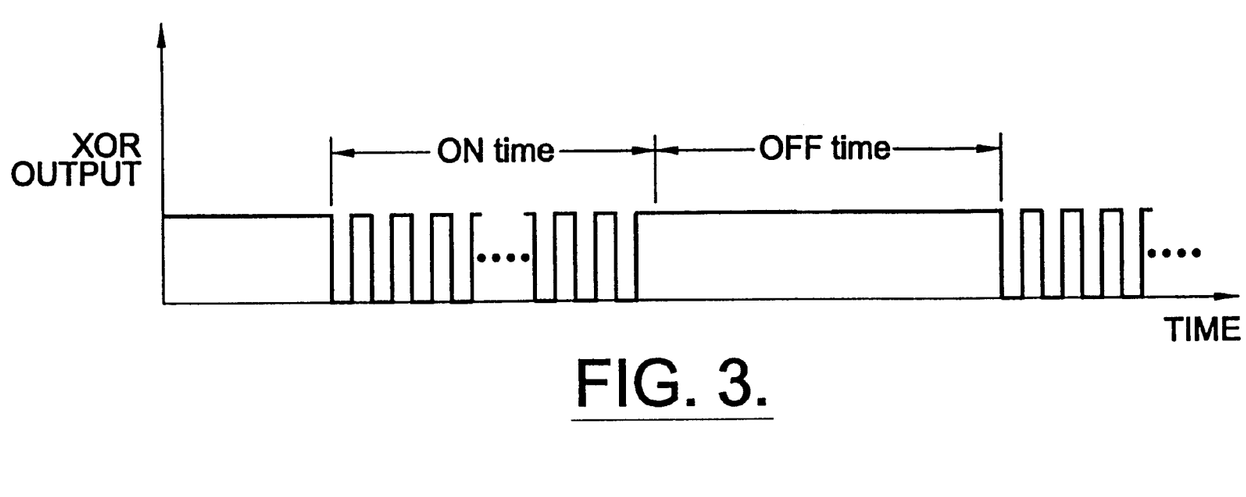
FIG. 3 is a timing diagram illustrating a modulated indicator control signal generated by the indicator control circuit of FIG. 2.

FIG. 3 graphically illustrates an example of a pulse width modulated indicator control signal at the output of the XOR gate 130 of FIG. 2. In particular, the signal of FIG. 3 is an active low signal with a 50% duty factor. During the "OFF time", the signal is maintained at a high level for a period of time determined by the off-time value stored in the off-time register 52. During the "ON-time", the signal is pulse width modulated a frequency determined by the clock 112 and the counter 120 with a duty cycle determined by the pulse-duty value stored in the pulse-duty register 54 for a period of time determined by the on-time value stored in the on-time register 50. As shown in FIG. 3, the duty cycle can be approximately 50%. The active low signal is provided by storing an output-sense value of "zero" in the output-sense register 132. Alternately, an active high signal can be provided by storing an output-sense value of "one" in the output-sense register 132.

The controller 24 of the present invention including the processor 28 and the indicator control circuit 30 can be implemented as one or more standard and/or custom integrated circuit devices and/or discrete devices. For example, the processor and the indicator control circuit can be implemented as an application specific integrated circuit device. Alternately, the processor and the indicator control circuit can be implemented as separate devices.

According to the circuits and methods of the present invention, an indicator can be alternatingly enabled and disabled for predetermined periods of time based on values stored in on-time and off-time registers. Accordingly, processing overhead can be reduced because the on- and off-time values can be stored by the processor in the registers so that the processor is not required to initiate repeated on and off instructions and/or calculations. Instead, the indicator control circuit of the present invention handles the control of the indicator responsive to the stored on- and off-time values. The indicator control circuit of the present invention can also provide pulse width modulation based on a pulse-duty value stored in a pulse duty register.

In the drawings and specification, there have been disclosed typical preferred embodiments of the invention and, although specific terms are employed, they are used in a generic and descriptive sense only and not for purposes of limitation, the scope of the invention being set forth in the following claims. While the present invention has been discussed above with reference to radiotelephones, the methods and circuits of the present invention can be used in other electronic devices. For example, the methods and systems of the present invention can also be used in pagers.

That which is claimed is:

1. An electronic device comprising:
   an indicator that generates an indication of an event responsive to an indicator control signal;
   a processor that generates an indicator off-time value and an indicator on-time value when an indication is desired;

an indicator control circuit coupled between the processor and the indicator wherein the indicator control circuit receives the indicator off-time value and the indicator on-time value from the processor and wherein the indicator control circuit includes,
- an off-time register coupled to the processor that stores the off-time value generated by the processor,
- an on-time register coupled to the processor that stores the on-time value generated by the processor,
- an indicator control signal generator coupled to the off-time register and coupled to the on-time register wherein the indicator control signal generator alternatingly and repeatedly enables the indicator control signal for a period of time determined by the on-time value stored in the on-time register and disables the indicator control signal for a period of time determined by the off-time value stored in the off-time register,
- a timer that generates an incrementing elapsed time,
- a multiplexer coupled to the on-time register and to the off-time register wherein the multiplexer selects one of the on-time value from the on-time register and the off-time value from the off-time register,
- a comparator coupled to the multiplexer and the timer wherein the comparator compares the incrementing elapsed time with the selected one of the on-time value and the off-time value and wherein the comparator generates a signal when the elapsed time reaches the selected one of the on-time value and the off-time value, and
- a latching circuit coupled to the comparator wherein the latching circuit switches a state of the indicator control signal and resets the timer responsive to the signal that the elapsed time has reached the selected one of the on-time value and the off-time value, and wherein the multiplexer selects the other of the on-time value and the off-time value responsive to the signal.

2. An electronic device according to claim 1 wherein the indicator control signal is disabled when the on-time value stored in the on-time register is zero.

3. An electronic device according to claim 1 wherein the timer includes a counter coupled to a clock.

4. An electronic device according to claim 3 wherein the indicator control circuit disables the clock when the on-time value stored in the on-time register is zero.

5. An electronic device according to claim 3, wherein the indicator control circuit disables the clock when the off-time value stored in the off-time register is zero.

6. An electronic device according to claim 1 wherein the processor generates an indicator pulse-duty, wherein the indicator control circuit receives the indicator pulse-duty, the indicator control circuit further including,
- an indicator pulse-duty register coupled to the processor that stores the indicator pulse-duty generated by the processor, and
- a pulse width modulation circuit coupled to the indicator pulse-duty register wherein the pulse width modulation circuit modulates a pulse width of the enabled indicator control signal in response to the indicator pulse-duty stored in the indicator pulse-duty register.

7. An electronic device according to claim 6, wherein the pulse width modulation circuit includes,
- a timer that generates an incrementing elapsed time up to a predetermined value and then starts over, and
- a comparator coupled to the timer and coupled to the indicator pulse-duty register wherein the comparator compares the elapsed time and the indicator pulse-duty and wherein the pulse width modulation circuit modulates the pulse width of the enabled indicator control signal responsive to the comparison of the elapsed time and the indicator pulse-duty.

8. An electronic device according to claim 7 wherein the timer comprises a counter coupled to a clock.

9. An electronic device according to claim 8 wherein the indicator control circuit disables the clock when the indicator control signal is disabled.

10. An electronic device according to claim 8 wherein the indicator control circuit disables the clock when the on-time value is zero.

11. An electronic device according to claim 1 further comprising:
- a transceiver coupled to the processor wherein the transceiver transmits and receives radio communications under control of the processor.

12. An electronic device according to claim 1 wherein the indicator is selected from a group consisting of a buzzer, a ringer, a light, a vibrator, and an annunciator.

13. An electronic device comprising:
- an indicator that generates an indication of an event responsive to an indicator control signal;
- a processor that generates an indicator off-time value and an indicator on-time value when an indication is desired;
- an indicator control circuit coupled between the processor and the indicator wherein the indicator control circuit receives the indicator off-time value and the indicator on-time value from the processor and wherein the indicator control circuit includes,
  - an off-time register coupled to the processor that stores the off-time value generated by the processor,
  - an on-time register coupled to the processor that stores the on-time value generated by the processor, and
  - an indicator control signal generator coupled to the off-time register and coupled to the on-time register wherein the indicator control signal generator alternatingly enables the indicator control signal for a period of time determined by the on-time value stored in the on-time register and disables the indicator control signal for a period of time determined by the off-time value stored in the off-time register;
- an output sense control circuit coupled between the indicator control circuit and the indicator and coupled to the processor wherein the output sense control circuit includes,
  - an output sense register coupled to the processor that stores an output sense value generated by the processor, and
  - an output sense logic circuit that passes the indicator control signal in response to a first output sense value and inverts the indicator control signal in response to a second output sense value.

14. An electronic device comprising:
- an indicator that generates an indication of an event responsive to an indicator control signal;
- a processor that generates an indicator pulse-duty when an indication is desired;
- an indicator control circuit coupled between the processor and the indicator wherein the indicator control circiut receives the indicator pulse-duty from the processor, wherein the indicator control circuit includes,
  - an indicator pulse-duty register coupled to the processor that stores the indicator pulse-duty generated by the processor, and a pulse width modulation circuit coupled to the indicator pulse-duty register wherein the pulse width modulation circuit modulates a pulse width of an enabled indicator control signal in response to the indicator pulse-duty stored in the indicator pulse-duty register; and an output sense control circuit coupled between the indicator control circuit and the indicator and coupled to the processor wherein the output sense control circuit includes, an output sense register coupled to the processor that stores an output sense value generated by the processor, and an output sense logic circuit that passes the indicator control signal in response to a first output sense value and inverts the indicator control signal in response to a second output sense value.

15. An electronic device according to claim 14 wherein the pulse width modulation circuit includes, a timer that generates an incrementing elapsed time up to a predetermined value and then starts over, and a comparator coupled to the timer and coupled to the indicator pulse-duty register wherein the comparator compares the elapsed time and the indicator pulse-duty and wherein the pulse width modulation circuit modulates the pulse width of the enabled indicator control-signal responsive to the comparison of the elapsed time and the indicator pulse-duty.

16. An electronic device according to claim 14 wherein the timer includes a counter coupled to a clock.

17. An electronic device according to claim 16 wherein the indicator control circuit disables the clock when the indicator control signal is disabled.

18. An electronic device according to claim 17 wherein the processor generates an indicator off-time value and an indicator on-time value when an indication is desired, wherein the indicator control circuit receives the indicator off-time value and the indicator on-time value from the processor, and wherein the indicator control circuit further includes, an off-time register coupled to the processor that stores the off-time value generated by the processor, an on-time register coupled to the processor that stores the on-time value generated by the processor, and an indicator control signal generator coupled to the off-time register and coupled to the on-time register wherein the indicator control signal generator alternatingly and repeatedly enables the indicator control signal for a period of time determined by the on-time value stored in the on-time register and disables the indicator control signal for a period of time determined by the off-time value stored in the off-time register.

19. An electronic device according to claim 18 wherein the indicator control signal is disabled when the on-time value stored in the on-time register is zero.

20. An electronic device according to claim 14 further comprising:

a transceiver coupled to the processor wherein the transceiver transmits and receives radio communications under control of the processor.

21. An electronic device according to claim 14 wherein the indicator is selected from a group consisting of a buzzer, a ringer, a light, a vibrator, and an annunciator.

22. An electronic device comprising:

an indicator that generates an indication of an responsive to an indicator control signal;

a processor that generates an indicator pulse-duty when an indication is desired; and an indicator control circuit coupled between the processor and the indicator wherein the indicator control circuit receives the indicator pulse-duty from the processor, wherein the indicator control circuit includes, an indicator pulse-duty register coupled to the processor that stores the indicator pulse-duty generated by the processor, and a pulse width modulation circuit coupled to the indicator pulse-duty register wherein the pulse width modulation circuit modulates a pulse width of an enabled indicator control signal in response to the indicator pulse-duty stored in the indicator pulse-duty register wherein the pulse width modulation circuit includes a timer that generates an incrementing elapsed time up to a predetermined value and then starts over wherein the timer includes a counter coupled to a clock, and wherein the indicator control circuit disables the clock when the indicator control signal is disabled, and a comparator coupled to the timer and coupled to the indicator pulse-duty register wherein the comparator compares the elapsed time and the indicator pulse-duty and wherein the pulse width modulation circuit modulates the pulse width of the enabled indicator control signal responsive to the comparison of the elapsed time and the indicator pulse-duty;

wherein the processor generates an indicator off-time value and an indicator on-time value when an indication is desired, wherein the indicator control circuit receives the indicator off-time value and the indicator on-time value from the processor, and wherein the indicator control circuit further includes, an off-time register coupled to the processor that stores the off-time value generated by the processor, an on-time register coupled to the processor that stores the on-time value generated by the processor, and an indicator control signal generator coupled to the off-time register and coupled to the on-time register wherein the indicator control signal generator alternatingly and repeatedly enables the indicator control signal for a period of time determined by the on-time value stored in the on-time register and disables the indicator control signal for a period of time determined by the off-time value stored in the off-time register, wherein the indicator control signal generator includes, a timer that generates an incrementing elapsed time, a multiplexer coupled to the on-time register and to the off-time register wherein the multiplexer selects one of the on-time value from the on-time register and the off-time value from the off-time register, a comparator coupled to the multiplexer and the timer wherein the comparator compares the incrementing elapsed time with the selected one of the on-time value and the off-time value and wherein the comparator generates a signal when the elapsed time reaches the selected one of the on-time value and the off-time value, and a latching circuit coupled to the comparator wherein the latching circuit switches a state of the indicator control signal and resets the timer responsive to the signal that the elapsed time has reached the selected one of the on-time value and the off-time value, and wherein the multiplexer selects the other of the on-time value and the off-time value responsive to the signal.

23. An electronic device according to claim 22 wherein the timer includes a counter coupled to a clock.

24. An electronic device according to claim 23 wherein the indicator control circuit disables the clock when the on-time value stored in the on-time register is zero.

25. An electronic device according to claim 23 wherein the indicator control circuit disables the clock when the off-time value stored in the off-time register is zero.

26. A method of controlling an indicator for a radiotelephone used to provide radiotelephone communications wherein the radiotelephone includes a radiotelephone indicator that generates an indication of an event responsive to an indicator control signal, the method comprising the steps of:

storing an off-time value in an off-time register;

storing an on-time value in an on-time register; and alternatingly enabling the indicator control signal for a period of time determined by the on-time value stored in the on-time register and disabling the indicator control signal for a period of time determined by the off-time value stored in the off-time register;

storing an output sense value in an output sense register;

passing the indicator control signal in response to a first output sense value; and inverting the indicator control signal in response to a second output sense value.

27. A method according to claim 26 wherein the indicator control signal is disabled when the on-time value stored in the on-time register is zero.

28. A method according to claim 26 wherein the step of alternatingly enabling and disabling the indicator control signal comprises, generating an incrementing elapsed time, selecting one of the on-time value from the on-time register and the off-time value from the off-time register, comparing the incrementing elapsed time with the selected one of the on-time value and the off-time value, generating a signal when the elapsed time reaches the selected one of the on-time value and the off-time value, switching a state of the indicator control signal and resetting the timer responsive to the signal that the elapsed time has reached the selected one of the on-time value and the off-time value, and selecting the other of the on-time value and the off-time value responsive to the signal.

29. A method according to claim 28 wherein the step of generating an incrementing elapsed time comprises generating the incrementing elapsed time in response to a clock signal generated by a clock.

30. A method according to claim 29 further comprising the step of:

disabling the clock when the on-time value stored in the on-time register is zero.

31. A method according to claim 29 further comprising the step of:

disabling the clock when the off-time value stored in the off-time register is zero.

32. A method according to claim 26 wherein the indicator is selected from a group consisting of a buzzer, a ringer, a light, a vibrator, and an annunciator.

33. A method of controlling an indicator for a radiotelephone used to provide radiotelephone communications wherein the radiotelephone includes a radiotelephone indicator that generates an indication of an event responsive to an indicator control signal, the method comprising the steps of:

storing an indicator pulse-duty in an indicator pulse-duty register;

modulating a pulse width of an enabled indicator control signal in response to the indicator pulse-duty stored in the indicator pulse-duty register to modulate an intensity of the radiotelephone indicator;

storing an output sense value in an output sense register;

passing the indicator control signal in response to a first output sense value; and inverting the indicator control signal in response to a second output sense value.

34. A method according to claim 33 wherein the indicator is selected from a group consisting of a buzzer, a ringer, a light, a vibrator, and an annunciator.

35. A method of controlling an indicator for a radiotelephone used to provide radiotelephone communications wherein the radiotelephone includes a radiotelephone indicator that generates an indication of an event responsive to an indicator control signal, the method comprising the steps of:

storing an indicator pulse-duty in an indicator pulse-duty register; and modulating a pulse width of an enabled indicator control signal in response to the indicator pulse-duty stored in the indicator pulse-duty register to modulate an intensity of the radiotelephone indicator, wherein the modulating step includes, generating an incrementing elapsed time up to a predetermined value, and comparing the elapsed time and the indicator pulse-duty and wherein the pulse width of the enabled indicator control signal is modulated responsive to the comparison.

36. A method according to claim 35 wherein the step of generating the incrementing elapsed time comprises generating the incrementing elapsed time in response to a clock signal generated by a clock.

37. A method according to claim 36 further comprising the step of disabling the clock when the indicator control signal is disabled.

38. A method according to claim 35 further comprising the steps of:

storing an output sense value in an output sense register;

passing the indicator control signal in response to a first output sense value; and inverting the indicator control signal in response to a second output sense value.

* * * * *